B. E. D. STAFFORD.
FLEXIBLE STAY BOLT FOR BOILERS.
APPLICATION FILED MAR. 18, 1909.
1,000,046.
Patented Aug. 8, 1911.
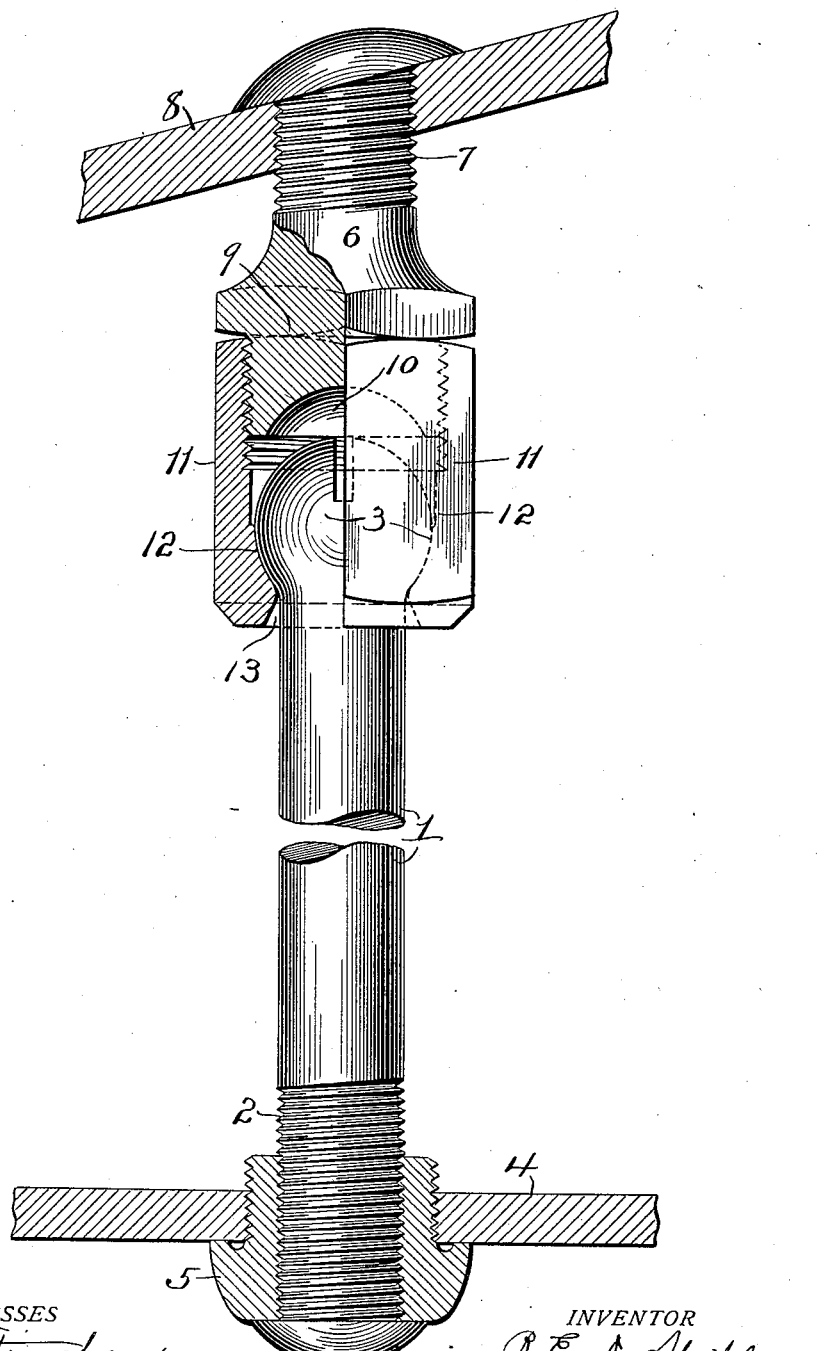

UNITED STATES PATENT OFFICE.

BENJAMIN E. D. STAFFORD, OF PITTSBURG, PENNSYLVANIA, ASSIGNOR TO FLANNERY BOLT COMPANY, OF PITTSBURG, PENNSYLVANIA.

FLEXIBLE STAY-BOLT FOR BOILERS.

1,000,046.  Specification of Letters Patent.  Patented Aug. 8, 1911.

Application filed March 18, 1909. Serial No. 484,249.

*To all whom it may concern:*

Be it known that I, BENJAMIN E. D. STAFFORD, of Pittsburg, in the county of Allegheny and State of Pennsylvania, have invented certain new and useful Improvements in Flexible Stay-Bolts for Boilers; and I do hereby declare the following to be a full, clear, and exact description of the invention, such as will enable others skilled in the art to which it appertains to make and use the same.

My invention relates to an improvement in flexible stay bolts for boilers, the object being to provide a simple and effective flexible stay that will be sufficiently rigid to prevent collapsing, and at the same time be adjusted to yield a limited distance longitudinally so as to safeguard against breakage by the expansion or separation of the sheets to which they are secured.

A further object is to provide a stay that may be adjusted for longitudinal extension after the parts have been assembled.

With these and other objects in view my invention consists in the parts and combination of parts as will be more fully described and pointed out in the claim.

The accompanying drawing is a view partly in elevation and partly in section of my improved stay.

1 represents a bolt of the type shown in the Tate Patent No. 753,329, one end 2 of which is screw threaded and the other end terminating in a spherical head 3. The threaded end of this bolt is secured to the inner sheet 4 of the boiler, or to a threaded bushing 5, secured within a threaded opening in said sheet, as shown in the drawing.

6 is a stub bolt having a screw threaded end 7 by which it is secured to the outer sheet 8 of the boiler, and is provided at its inner end with an enlarged head 9 concaved as at 10 on its lower or inner face. The two bolts 1 and 6 are in the same plane, with their heads somewhat removed so as to provide for elongation and contraction, and are connected or coupled by the sleeve 11 which embraces the head 3 of bolt 1, and is screwed onto the head 9 of the bolt 6.

The sleeve 11 is provided with a seat 12 conforming to the curvature of the head 3 of bolt 1, against which said head has bearing, and is also provided with a flaring throat 13 which permits of lateral movement of either bolt without throwing any strains on the connection. With this construction the sheets are braced against pressure tending to separate them, as strongly as it could be by rigid braces, and also against undue expansion of either plate, and at the same time provides for lateral movement of either bolt due to expansion of the sheet, and permits of the adjustment of the parts after they have been assembled.

It is evident that many slight changes might be resorted to in the relative arrangement of parts shown and described without departing from the spirit and scope of my invention hence I would have it understood that I do not wish to confine myself to the exact construction and arrangement of parts shown, but—

Having fully described my invention what I claim as new and desire to secure by Letters-Patent, is:—

A flexible stay bolt for boilers consisting of two members one having a rounded head and the other an enlarged integral head having a recessed face adapted to coact with the rounded head on the first mentioned member, the said enlarged head being screw threaded externally, and a sleeve having a flaring throat through which the stem of the first mentioned member passes and embracing the head of said member, the said sleeve having female threads whereby it is adjustably secured direct to the internal recessed head of the other member.

In testimony whereof, I have signed this specification in the presence of two subscribing witnesses.

BENJAMIN E. D. STAFFORD.

Witnesses:
EDWIN S. RYCE,
HOWARD O. CAPPEL.

---

Copies of this patent may be obtained for five cents each, by addressing the "Commissioner of Patents, Washington, D. C."